United States Patent [19]
Asbridge et al.

[11] Patent Number: 5,958,131
[45] Date of Patent: Sep. 28, 1999

[54] CEMENTITIOUS COMPOSITIONS AND THEIR USES

[75] Inventors: Anthony Hales Asbridge, Truro; Thomas Richard Jones, St Austell, both of United Kingdom

[73] Assignee: ECC International Ltd., United Kingdom

[21] Appl. No.: 08/992,887

[22] Filed: Dec. 18, 1997

[30] Foreign Application Priority Data

Dec. 19, 1996 [GB] United Kingdom .................... 9626320

[51] Int. Cl.$^6$ .................................................. C04B 14/00
[52] U.S. Cl. .......................... 106/718; 106/722; 106/724; 106/732; 106/735
[58] Field of Search ..................................... 106/718, 722, 106/724, 732, 735, 811

[56] References Cited

U.S. PATENT DOCUMENTS

| | | | |
|---|---|---|---|
| 5,626,665 | 5/1997 | Barger et al. | 106/706 |
| 5,714,002 | 2/1998 | Styron | 106/705 |
| 5,788,762 | 8/1998 | Barger et al. | 106/706 |

FOREIGN PATENT DOCUMENTS

| | | |
|---|---|---|
| 06001646 | 1/1994 | Japan . |
| 1508866 | 4/1978 | United Kingdom . |
| WO 93/04007 | 3/1993 | WIPO . |
| WO 96/35649 | 11/1996 | WIPO . |

*Primary Examiner*—Paul Marcantoni
*Attorney, Agent, or Firm*—Suzanne Kikel

[57] ABSTRACT

A composition suitable for adding to water to produce a water-resistant hydraulic solid which composition comprises components (a), (b) and (c) as follows:

(a) calcium sulphate hemihydrate;
(b) portland cement;
(c) calcined clay having a pozzolanic activity;

wherein the percentages by weight of components (a), (b) and (c) in the said composition are in the respective ranges:

(a) from 20% to 98%;
(b) from 1% to 50%;
(c) from 1% to 30%;

the percentages of components (a), (b) and (c) adding to 100% in the three component composition.

11 Claims, No Drawings

CEMENTITIOUS COMPOSITIONS AND THEIR USES

BACKGROUND OF THE INVENTION

The present invention relates to cementitious compositions and their uses.

In particular, this invention concerns water resistant cementitious compositions comprising calcium sulphate hemihydrate and portland cement, and is particularly concerned with cementitious compositions for use as exterior mortars, rendering compositions and cast articles and the like, and in applications in which water resistance, good surface finish and a rapid gain in strength in the early stages following application are important.

Both calcium sulphate hemihydrate and portland cement can individually be reacted with water and used in the applications outlined above, but there are both advantages and disadvantages associated with each of these cementitious materials. Calcium sulphate hemihydrate, when hydrated with water, possesses good workability before setting commences, and also shows a useful gain in strength within the first two hours of application. It can also be applied to give a fine surface finish. It is, however, appreciably soluble in water, and therefore unsuitable for use where it will be exposed to weathering. Portland cement, when hydrated with water, gains strength only slowly, shows a poorer surface finish than calcium sulphate-based compositions, but is relatively insoluble in water.

A product formed by hydrating a mixture of calcium sulphate hemihydrate and portland cement might be expected to give the advantages of each of these two cementitious materials, while diluting the effects of their individual weaknesses. Unfortunately, however, chemical reactions occur between sulphate ions, which are supplied principally by the calcium sulphate, and aluminium compounds in the hydrated portland cement. For example tricalcium aluminate and hydrated calcium aluminosulphate $[(CaO)_3.Al_2O_3.CaSO_4.(H_2O)_{12}]$, produce a hydrated calcium aluminosulphate of large crystal volume which may be represented by the formula $(CaO)_3.Al_2O_3.(CaSO_4)_3.(H_2O)_{32}$, and which will be referred to hereinafter as "Aft". The expansive forces introduced into a hardened cementitious product by the formation of Aft can cause cracking and subsequent terminal deterioration of the product.

SUMMARY OF THE INVENTION

According to the present invention in a first aspect there is provided a composition suitable for adding to water to form a water resistant hydraulic solid composition comprising from 20% to 98% by weight of (a) calcium sulphate hemihydrate ($CaSO_4.\frac{1}{2}H_2O$), from 1% to 50% by weight of (b) portland cement, and from 1% to 30% by weight of (c) a calcined clay having a pozzolanic activity.

DESCRIPTION OF THE INVENTION

As described above, the invention concerns use of a pozzolanic calcined clay in a calcium sulphate hemihydrate/portland cement composition, ie. components (a), (b) and (c) as defined above. Examples of such calcined clay are the products of calcining materials comprising kandite and/or smectite clays especially kaolin, illite, illitic/kaolinitic clay, calcium montmorillonite, sodium montmorrilonite and mixtures of mica/smectite and sepiolite. Preferably the pozzolanic activity is such that the reactivity of the calcined clay with calcium hydroxide is at least 100 mg of calcium hydroxide per gramme, especially at least 500 mg of calcium hydroxide per gramme. Preferably, the calcined clay comprises a metakandite, eg. metakaolin having a reactivity with calcium hydroxide of at least 700 mg calcium hydroxide per gramme.

The weight percentage of (a), (b) and (c) adds to 100% in the said composition. The composition comprising components (a), (b) and (c) may be present together with other optional components.

The proportion by weight of calcium sulphate hemihydrate in the said composition is preferably in the range of from 47.5% to 91% by weight; the proportion by weight of portland cement is preferably in the range of from 7% to 40% by weight and the proportion by weight of calcined clay is preferably in the range of from 2% to 12.5% by weight. Desirably, the ratio by weight of portland cement to calcined clay is in the range 2:1 to 10:1 and the ratio by weight of calcium sulphate hemihydrate to portland cement is in the range 2:1 to 10:1.

By "portland cement" is meant a cement that hardens under water. Such a cement may be produced in a traditional manner by heating a slurry of clay and calcium carbonate, (eg. chalk or limestone).

By a "hydraulic" solid composition is meant a solid composition that binds and hardens under water.

The composition according to the first aspect may be a dry composition, eg. a mixture of dry powders.

Where the calcined clay comprises metakaolin, the metakaolin may advantageously be metakaolin prepared by calcining a kaolinitic clay at a temperature in the range of from 450° C. to 900° C. under conditions such that the metakaolin has a reactivity with calcium hydroxide of at least 700 mg of calcium hydroxide per gramme.

It is well known that the pozzolanic reactivity of a metakaolin is determined by the properties of the feed clay and the processing conditions. Relevant literature references describing the required conditions are:

(i) 'High Performance Concretes Incorporating Metakaolin—A Review', paper at Conference entitled CONCRETE 2000, University of Dundee, Sep. 7–9, 1993 by J. A. Kostuch, G. V. Walters and T. R. Jones;

(ii) Walters, G. V. and Jones, T. R., 2nd International Conference, 'Durability of Concrete', Canada, ed. V. M. Malhotra, 1991, pp. 941–953;

(iii) Murat, M., Ambroise, J. and Pera, J., 'Hydration reaction and hardening of calcined clays and related minerals', Cement and Concrete Research, v. 15, 1985, pp. 261–268;

(iv) Ambroise, J., Martin-Calle, S. and Pera, J., 4th International Conference, 'Durability of Concrete', Turkey, ed. V. M. Malhotra, 1992, pp. 731–739.

In order to maximise pozzolanic reactivity the feed clay, kaolin, for conversion by calcination into metakaolin should be either naturally pure, or refined by standard mineral processing techniques. Thermal activation (calcination) is the most critical processing stage: the clay is preferably calcined within the temperature range 700–900° C., depending on the mineral source. Any impurity minerals act as diluents. It has been reported that with increasing purity of metakaolin, the compressive strength of the concrete increased, and the level of $Ca(OH)_2$ in the hardened matrix decreased. Desirably, the presence of alkali metal oxides which act as fluxing agents is minimised in the purification process.

The reactivity of a calcined clay such as metakaolin with calcium hydroxide is determined by a method which is generally known in the field of concrete technology as the "Chappelle test". In this test a dilute slurry of the calcined clay is reacted with excess calcium hydroxide at 95° C. for 18 hours. At the end of this period, the amount of unreacted calcium hydroxide is determined by titration. The procedure is described in detail by R. Largent, Bull. Liaison Lab. Ponts et Chaussées, Vol. 93 (1978), page 63. The results are expressed as the weight of calcium hydroxide in milligrams absorbed by one gram of calcined clay, eg. metakaolin.

According to the present invention in a second aspect there is provided a hydrated hydraulic composition comprising a composition according to the first aspect together with water. The hydrated hydraulic composition preferably comprises (i) water and (ii) the mixture of components (a), (b) and (c) in proportions of (i) to (ii) in the range of from 0.2:1 to 1.0:1, and more preferably in the range of from 0.35:1 to 0.7:1.

The hydraulic composition may also contain one or more additives known for use in the formation of cementitious compositions.

Additives in the various known classes of materials incorporated in aqueous particulate suspensions for use by addition to cementitious compositions or formation of cements or cement-containing products may be incorporated in the said hydrated hydraulic composition added either as part of the dry cementitious composition or separately. Such optional additives include, for example, (i) dispersing agents, eg. water soluble polymers such as polycarboxylates, eg. polyacrylic acids and their salts, lignosulphonate salts and sulphonated melamine or naphthalene formaldehydes and also alkali silicates;

(ii) water repellents, eg. stearates of calcium, zinc or aluminium or other chemicals with hydrophobic imparting properties;

(iii) other inorganic particulate material having pozzolanic properties, eg. fine siliceous materials;

(iv) other additives deemed appropriate or necessary for the final product application, eg. micaceous materials and other mineral extenders or property modifiers;

(v) colouring agents, eg. pigments such as iron oxides;

(vi) shrinkage control agents;

(vii) fibres, whiskers, rods, strands, foils, beads and the like to play a part in the cementitious material produced from the suspension, eg. as a shrinkage control agent and/or as a tensile strength improver; such additives may be made of materials known for this application, eg. fibres may be made of glass and/or thermoplastic materials;

(viii) biocides;

(ix) commercially available chemicals to retard or accelerate setting of cement;

(x) chemicals to entrain air in cement or composites thereof to impart freeze-thaw resistance;

(xi) chemicals such as calcium nitrate to inhibit corrosion of materials employed to reinforce cement composites, eg. steel employed to reinforce concrete.

The hydrated hydraulic composition may also include one or more additives to control the workability and/or setting time of the binder composition, eg. sulphonated melamine, naphthalene-formaldehyde condensates, lignosulphonate condensates and polymers and co-polymers of acrylic acid and salts thereof. Also included in the hydrated composition may be one or more additives to enhance the strength and stability of the cementitious body formed after setting. These additives may include, for example, synthetic polymeric compounds, such as poly(vinyl acetate), and compounds having hydrophobic species, such as salts of carboxylic acids having from 12 to 24 carbon atoms in the hydrocarbon chain, and especially salts of stearic acid.

The inclusion of calcined clay having a pozzolanic activity, eg. metakaolin, in a cementitious composition, together with calcium sulphate hemihydrate and portland cement unexpectedly and beneficially is effective in rendering the composition, after hydration and setting, more resistant to attack by water. Whilst we do not wish to be bound by any particular theory, we believe that the water resistance is achieved because the calcined clay is reactive towards chemical compounds such as hydroxides of calcium and sodium and sulphates of calcium and sodium, which are produced during the hydration of mixtures of calcium sulphate hemihydrate and portland cement. Calcined clay such as metakaolin reacts with, and immobilises, chemical compounds which would otherwise take part in a reaction to form Aft, which would cause expansion and deterioration of the hydrated hydraulic composition after setting.

It is found unexpectedly and beneficially that hydrated hydraulic compositions in accordance with the second aspect of the invention exhibit good workability in the wet state, and, after setting, develop strength in a relatively short time, and can bond articles or produce cast articles with good surface finish, and can have good long term stability and resistance to attack by water.

According to the present invention in a third aspect there is provided a method of use of a composition according to the second aspect which includes applying a composition according to the second aspect as a cement between at least two articles and allowing the composition to set to form a waterproof bond between the articles. The articles may be any of the known articles bonded by inorganic cements, eg. bricks, blocks, slabs, aggregates, drains, pipes and the like.

According to the present invention in a fourth aspect there is provided a method of producing an article which includes casting the article using a composition according to the second aspect and allowing the article to set to form a waterproof outer surface.

According to the present invention in a fifth aspect there is provided an article produced by the method according to the fourth aspect.

The said article may be for example a plasterboard panel or a simulated stone-effect article, eg. a shaped article such as a garden statue or other ornament.

Specific applications in which the material according to the second aspect may be used include grouting, cementing, panelling, rendering or coating internal or external surfaces of building walls or ceilings, and repairing, eg. to fill cracks in walls or floors, as well as casting into shapes.

The composition according to the second aspect may be mixed with other materials in a similar manner to the mixing of conventional calcium sulphate compositions with such materials. For example, the composition may be mixed with sand and aggregate to produce a concrete for use in any of the existing applications for concrete. The concrete may contain any of the additional constituents conventionally used, eg. fibres or rods for reinforcement purposes.

DESCRIPTION OF EMBODIMENTS OF THE INVENTION

Embodiments of the present invention will now be described by way of example with reference to the following Examples.

EXAMPLE 1

Comparative

Three cementitious compositions A, B and C all made from calcium sulphate hemihydrate, portland cement and water, but no added pozzolanic material, were prepared according to the formulations given in Table 1 below:

TABLE 1

| Sample | CaSO$_4$.½H$_2$O (parts by wt.) | Portland Cement (parts by wt.) | Water (parts by wt.) |
| --- | --- | --- | --- |
| A | 100 | 0 | 50 |
| B | 90 | 10 | 50 |
| C | 80 | 20 | 50 |

The components of each composition were blended together dry before the addition of water. After the water had been mixed in, the resultant paste was stirred until it was visually homogeneous, and was then cast into cylindrical moulds of diameter 11 mm and height 18 mm. The filled moulds were covered with a moist cloth which, in turn, was covered with a plastics sheet to inhibit evaporation. 24 hours after casting, the cylindrical samples were removed from the moulds and stored under water at a temperature in the range of from 18° C. to 22° C. After storing for 7 days, 28 days and 96 days, respectively, samples were removed and tested for compressive strength by means of a MONSANTO™ T10 tensometer. The results are set forth in Table 2 below.

TABLE 2

| | Compressive strength (MPa) | | |
| --- | --- | --- | --- |
| | Storage time (days) | | |
| Sample | 7 | 28 | 96 |
| A | 3.2 | 4.7 | 2.0 |
| B | 6.6 | 7.3 | 5.5 |
| C | 8.1 | 8.0 | 6.5 |

EXAMPLE 2

Invention

Five cementitious compositions A, B and C containing calcium sulphate hemihydrate, portland cement, metakaolin and water were prepared according to the formulations given in Table 3 below. The metakaolin was prepared by calcining a kaolinitic clay (having a particle size distribution such that 35% by weight consisted of particles having an equivalent spherical diameter smaller than 2 μm), at a temperature of 800° C. and for a time such that the reactivity of the metakaolin with calcium hydroxide was 1050 mg of calcium hydroxide per gramme.

TABLE 3

| Sample | CaSO$_4$.½H$_2$O (Parts by wt) | Portland cement (parts by wt) | Metakaolin (Parts by wt) | Water (Parts by wt) |
| --- | --- | --- | --- | --- |
| D | 90 | 8.5 | 1.5 | 50 |
| E | 80 | 18.0 | 2.0 | 50 |
| F | 70 | 22.5 | 7.5 | 50 |
| G | 50 | 42.5 | 7.5 | 50 |
| H | 50 | 37.5 | 12.5 | 50 |

Cylindrical moulded samples were prepared from each composition, and tested for compressive strength after storage under water for 7 days, 28 days and 96 days, respectively, as described in Example 1 above. The results are set forth in Table 4 below.

TABLE 4

| | Compressive strength (MPa) | | |
| --- | --- | --- | --- |
| | Storage time (days) | | |
| Sample | 7 | 28 | 96 |
| D | 6.0 | 7.7 | 7.5 |
| E | 8.0 | 7.7 | 9.6 |
| F | 9.0 | 15.7 | 17.1 |
| G | 12.6 | 12.4 | 13.8 |
| H | 12.1 | 21.4 | 22.3 |

If these results are compared with those set forth in Table 2 it will be seen that cementitious compositions containing a proportion of metakaolin yield cast articles which retain, or increase, their strength after storage under water for up to 96 days. This unexpected and beneficial behaviour is not observed with compositions which contain no metakaolin. It was also observed that the cast articles which had been prepared from the compositions containing metakaolin showed a good surface finish, even after storage under water for 96 days which was not the case with the comparative samples made as in Example 1.

EXAMPLE 3

A composition I containing calcium sulphate hemihydrate, portland cement, metakaolin and water was prepared according to the formulation given in Table 5 below. A conventional composition made from calcium sulphate hemihydrate, Composition A, was also prepared. The formulation of Composition A is also given for comparison in Table 5.

TABLE 5

| Sample | CaSO$_4$.½H$_2$O (Parts by wt) | Portland cement (Parts by wt) | Metakaolin (Parts by wt) | Water (Parts by wt) |
| --- | --- | --- | --- | --- |
| A (Comparative) | 100 | 0 | 0 | 50 |
| I (Invention) | 80 | 15 | 5 | 50 |

After mixing to prepare each composition separately, each composition was separately poured into cylindrical moulds as described in Example 1, and also into moulds having the shape of a cube of side 40 mm. The cast articles formed in the cylindrical moulds had a surface area to volume ratio of 0.36, while the cast articles formed in the cubic moulds had a surface area to volume ratio of 0.15. The cast articles formed in the two different types of mould were stored under water for 28 days, and were then tested for compressive strength. The results are set forth in Table 6 below.

TABLE 6

| | Compressive strength (MPa) | |
| --- | --- | --- |
| Sample | Surface area:volume 0.36 | Surface area:volume 0.15 |
| A | 4.7 | 8.4 |
| I | 16.0 | 16.3 |

These results show that the strength of the cast articles formed from comparative Composition A, which contained only calcium sulphate hemihydrate and water, is very sensitive to the surface area to volume ratio of the article. In the case of Composition I, which contained calcium sulphate hemihydrate, portland cement, metakaolin and water, in accordance with an embodiment of the invention, the compressive strength of the cast articles is virtually independent of the surface area to volume ratio. It was also observed that the cast articles which had been prepared from Composition I showed a good surface finish, even after storage under water for 28 days which did not apply in the case of Composition A.

We claim:

1. A composition suitable for adding to water to produce a water-resistant hydraulic solid which composition comprises components (a), (b) and (c) as follows:

(a) calcium sulphate hemihydrate;
   (b) portland cement;
   (c) calcined clay having a pozzolanic activity;

wherein the percentages by weight of components (a), (b) and (c) in the said composition are in the respective ranges:

(a) from 20% to 98%;
   (b) from 1% to 50%;
   (c) from 1% to 30%;

the percentages of components (a), (b) and (c) adding to 100% in the three component composition.

2. A composition as claimed in claim 1 and wherein the calcined clay comprises a metakandite.

3. A composition as claimed in claim 2 and wherein the metakandite comprises a metakaolin having a reactivity with calcium hydroxide of at least 700 mg calcium hydroxide per gramme.

4. A composition as claimed in claim 1 and which comprises a dry powder mixture.

5. A composition as claimed in claim 1 and which includes one or more other additives.

6. A composition as claimed in claim 1 and which is added to water.

7. A composition as claimed in claim 6 and wherein the wet composition contains in addition to components (a), (b) and (c) one or more other property modifying additives.

8. A method of use of a composition as claimed in claim 6 and which includes applying the composition as a cement between at least two articles and allowing the composition to set to form a waterproof bond between the articles.

9. A method of producing an article which includes casting the article using a composition as claimed in claim 6 and allowing the article to set to form a waterproof outer surface.

10. An article produced by the method claimed in claim 9.

11. A composition suitable for adding to water to produce a water-resistant hydraulic solid which composition comprises components (a), (b) and (c) as follows:

(a) calcium sulphate hemihydrate;
    (b) portland cement;
    (c) calcined clay having a pozzolanic activity;

wherein the percentages by weight of components (a), (b) and (c) in the said composition are in the respective ranges:

(a) from 47.5% to 91%;
    (b) from 7% to 40%;
    (c) from 2% to 12.5%;

the percentages of components (a), (b) and (c) adding to 100% in the three component composition.

* * * * *